United States Patent [19]

Umeda et al.

[11] Patent Number: 5,726,558
[45] Date of Patent: Mar. 10, 1998

[54] AC POWER GENERATING APPARATUS AND METHOD

[75] Inventors: Atsushi Umeda, Anjo; Shin Kusase; Makoto Taniguchi, both of Obu; Hirohide Sato, Toyokawa, all of Japan

[73] Assignee: Nippondenso Co., Ltd., Kariya, Japan

[21] Appl. No.: 627,587

[22] Filed: Apr. 4, 1996

[30] Foreign Application Priority Data

Apr. 24, 1995 [JP] Japan .................. 7-098260

[51] Int. Cl.$^6$ ........................................ H02P 9/10
[52] U.S. Cl. .................. 322/27; 322/36; 322/25
[58] Field of Search ........................ 322/25, 26, 27, 322/28

[56] References Cited

U.S. PATENT DOCUMENTS

| | | | |
|---|---|---|---|
| 5,177,677 | 1/1993 | Nakata et al. | 363/89 |
| 5,481,176 | 1/1996 | DeBiasi et al. | 322/7 |
| 5,483,146 | 1/1996 | Schultz et al. | 322/7 |
| 5,488,287 | 1/1996 | Kemner et al. | 322/20 |
| 5,512,813 | 4/1996 | Uchinami | 322/28 |
| 5,543,703 | 8/1996 | Kusase et al. | 322/16 |
| 5,550,457 | 8/1996 | Kusase et al. | 322/29 |

FOREIGN PATENT DOCUMENTS

| | | |
|---|---|---|
| 582 470 | 2/1994 | European Pat. Off. . |
| 4-138030 | 5/1992 | Japan . |

*Primary Examiner*—Thomas M. Dougherty
*Assistant Examiner*—Nicholas Ponomarenko
*Attorney, Agent, or Firm*—Cushman, Darby & Cushman IP Group of Pillsbury Madison & Sutro LLP

[57] ABSTRACT

Reverse current is supplied from a battery to armature coils of a three-phase synchronous power generator, via semiconductor switching devices of a three-phase full-wave rectifier, by controlling the switches. By this control, the reverse current will reduce waveform distortion of armature current of each phase so as to reduce the electromagnetic force pulsation and, therefore, reduce vibration or noise.

11 Claims, 12 Drawing Sheets

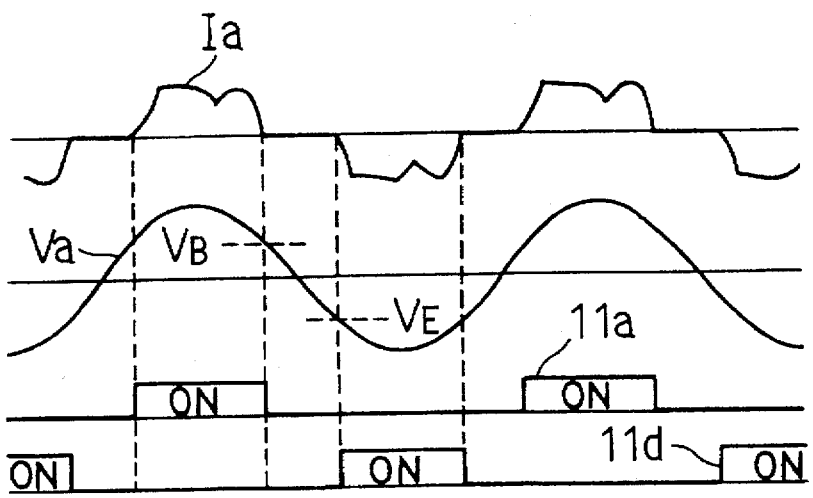
(ELECTROMAGNETIC FORCE PULSATION NON-SUPPRESSION MODE)
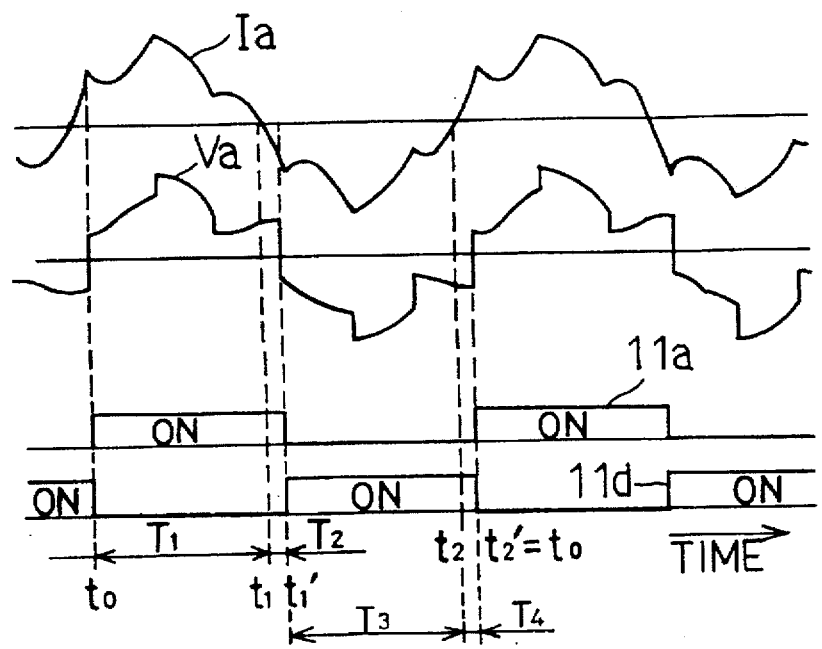
(ELECTROMAGNETIC FORCE PULSATION SUPPRESSION MODE)

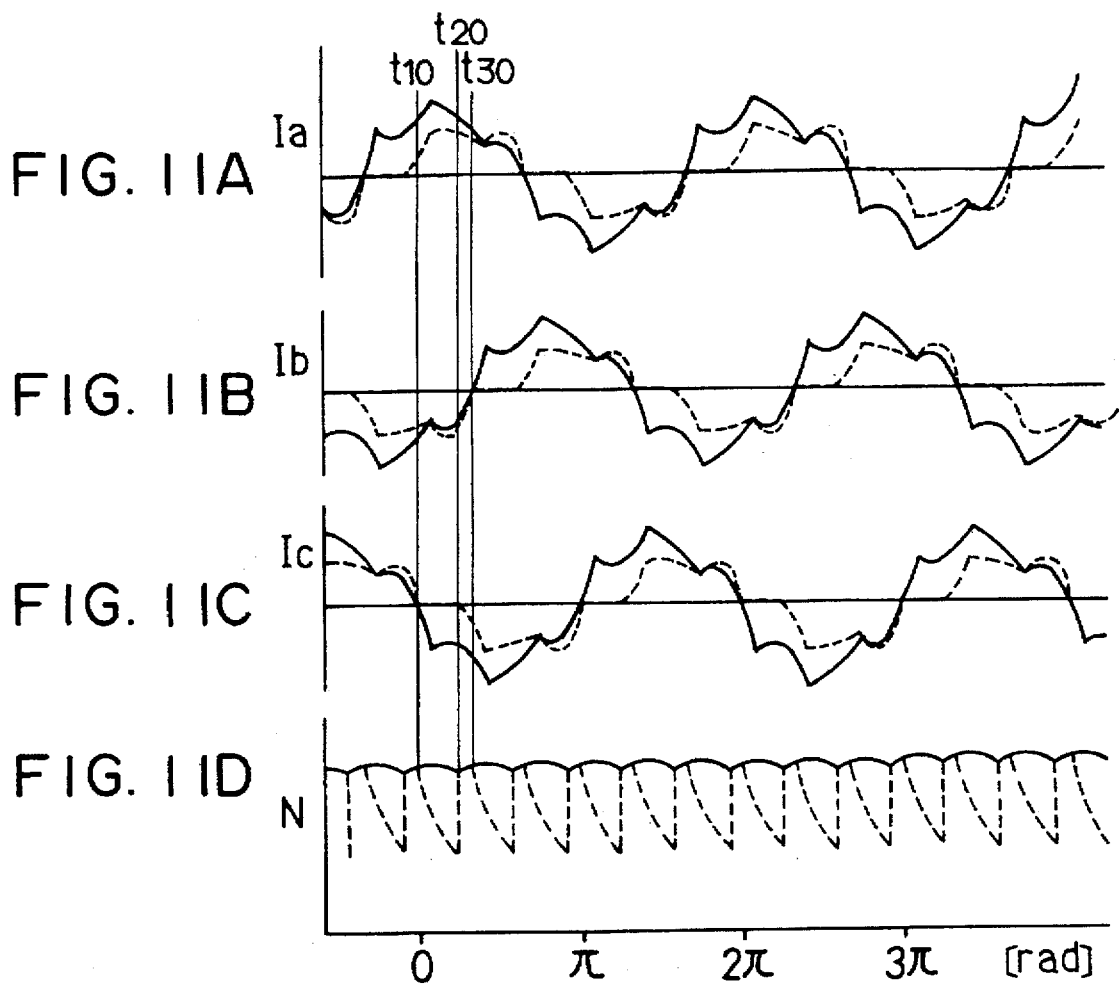

AT TIME t10

AT TIME t10

AT TIME t20

AT TIME t20

AT TIME t30

AT TIME t30

AT TIME t10

AT TIME t10

AT TIME t20

AT TIME t20

AT TIME t30

AT TIME t30

AC POWER GENERATING APPARATUS AND METHOD

BACKGROUND OF THE INVENTION

1. Field of the Invention

The present invention relates to an AC power generating apparatus having an AC power generator with Lundell-type field poles and a control method for the apparatus, and more particularly to reduction of electromagnetic force pulsation and electromagnetic noise associated therewith.

2. Description of Related Art

A conventional power generator having Lundell-type field poles used for vehicles has a three-phase full-wave rectifier having component diodes for rectifying the three-phase voltages generated. The generator supplies the DC current rectified by the three-phase full-wave rectifier to a battery or to vehicular electric loads.

However, in the conventional vehicular power generator, armature current flowing through an armature coil (stator winding) of each phase periodically varies (interruption of the armature current periodically occurs) so that the electromagnetic forces acting on various portions of the Lundell-type field poles pulsate. Thus, the conventional power generator has a problem in that when a predetermined frequency component of the electromagnetic force pulsation coincides with the specific resonance frequency of the Lundell-type field poles, large vibration or noise is produced. This vibration or noise tends to be produced at the rotational speed of the power generator of 1500-3000 rpm, that is, an engine idle operation range where other forms of noise are relatively small, so that the driver or passengers will easily perceive the vibration or noise. In addition, this vibration or noise is remarkable when the field magnetic flux is large and the core (rotor) is magnetically saturated.

To reduce the vibration or noise caused by the electromagnetic force pulsation of the vehicular power generators, a damper for damping vibrations is fitted to the Lundell-type field poles having the shape of a nail, or the sound insulation of the housing is increased according to the conventional art. However, these measures cause new problems, such as increase in production process required, complication of the construction, increase of the size or weight, and reduction of power output per unit weight.

SUMMARY OF THE INVENTION

Accordingly, it is an object of the present invention to provide an AC power generating apparatus and method that can reduce the vibration or noise by reducing the electromagnetic force pulsation.

It is another object of the present invention to provide an AC power generating apparatus and method that can reduce the vibration or noise while avoiding an increase in production process, complicated construction, increased size and weight, and reduced power output per unit weight.

The present invention is based on an inventors' finding that electromagnetic force pulsation is caused by the periodic variation of an armature current of each phase and consideration that it will be possible to suppress the vibration or noise by reducing the periodic variation of the armature current.

According to the present invention, physical quantities related to the frequency and phase of the electromagnetic force pulsation of an AC generator are detected and, on the basis of the detected frequency and phase, an armature coil (stator winding) of each phase is supplied with a discharge current (reverse current) having such a frequency and a phase as to suppress the electromagnetic force pulsation. The reverse current is supplied as the armature current flows in the direction opposite to that of the armature voltage (that is, flowing from a high-level DC power source terminal into the armature coil and then out of a low-level DC power source terminal). The electromagnetic force pulsation of the generator can thus be reduced and, accordingly, the vibration or noise of the generator caused by the electromagnetic force pulsation can be reduced.

More specifically, the control of supply of the reverse current is to supply the reverse current to the armature coil of the AC power generator (a so-called alternator) having the Lundell-type field poles in such a direction so that the flow into the armature coil, after a predetermined length of time, from the generated current flowing out of the armature coil becomes 0, and to supply the reverse current to the armature coil in such a direction so that the flow out of the armature coil, after the predetermined length of time, from the generated current flowing into the armature coil becomes 0. The predetermined length of time is the time from a first predetermined phase angle position to a second predetermined phase angle position within a single period, that is, the electrical angle $2\pi$ of the armature current of a given phase.

Preferably, the fundamental frequency of the reverse current is m×p×n. This will sufficiently reduce the electromagnetic force pulsation since the fundamental frequency of the electromagnetic force pulsation is m×p×n.

It is imperative in the control to reduce the length of time of no current flow. Preferably, this length of time is reduced to zero substantially by the effect of reverse current from a battery to the armature coil. In other words, interruption of the armature current of each phase is inhibited except the moment of shifting from positive to negative or from negative to positive. This construction will reduce the electromagnetic force pulsation and accordingly reduce the vibration or noise of the generator.

The electromagnetic forces spatially distributed and acting between the stator and the rotor act between the nail-shaped field poles, that is, the Lundell-type field poles, and the armature current spatially distributed and electromagnetically interacting with the Lundell-type field poles. This means that the pulsation of the electromagnetic force is caused by rapid changes of the armature current that is provided by the switching operation of a high-side switch or a low-side switch both of which constitute a two-way current switching circuit (inverter circuit). Therefore, by suppressing or inhibiting the rapid start or discontinuation of energization of the armature current, the electromagnetic force pulsation can be reduced and, accordingly, the vibration or noise of the generator can be reduced.

Preferably, a voltage of the armature coil is detected. Based on the detected armature voltage, a rapid change period (interruption period) of the armature current corresponding to the phase of the electromagnetic force pulsation component is detected and the discharge current of a DC battery during the rapid change period is supplied to suppress the electromagnetic force pulsation. Thus, this construction will easily control to prevent rapid increase or decrease of the armature current and to thereby reduce the electromagnetic force pulsation.

Preferably, the opposite-phase armature current is supplied if a field current supplied to a field coil provided around a rotor core. That is, since the electromagnetic force pulsation becomes more remarkable as the field current increases and the degree of saturation of the magnetic circuit increases, the reverse current (the discharge current of the battery) is not supplied if the field current is relatively small so that the vibration or noise is also small. The energy efficiency will thus be improved.

Preferably, an AC-DC converter is constituted by a two-way current switching circuit (inverter circuit) comprising a high-side switch and a low-side switch both of which are composed of semiconductor switching devices. This converter supplies the reverse current without requiring an inverter circuit of a complicated structure.

BRIEF DESCRIPTION OF THE DRAWINGS

In the accompanying drawings:

FIGS. 4A–4D are timing charts indicating the ON-timings of MOSFETs shown in FIG. 1 when the reverse armature current is not supplied;

FIGS. 5A–5D are timing charts indicating the ON-timings of the MOSFETs shown in FIG. 1 when the reverse armature current is supplied;

FIGS. 11A–11D are timing charts indicating the electromotive force pulsation when the reverse armature current is supplied or not supplied in the embodiment;

DETAILED DESCRIPTION OF PRESENTLY PREFERRED EMBODIMENTS

An embodiment of an AC power generating apparatus of the present invention will be described with reference to a block diagram shown in FIG. 1 and a sectional view of a three-phase synchronous power generator 100 shown in FIG. 2.

Figure 1:
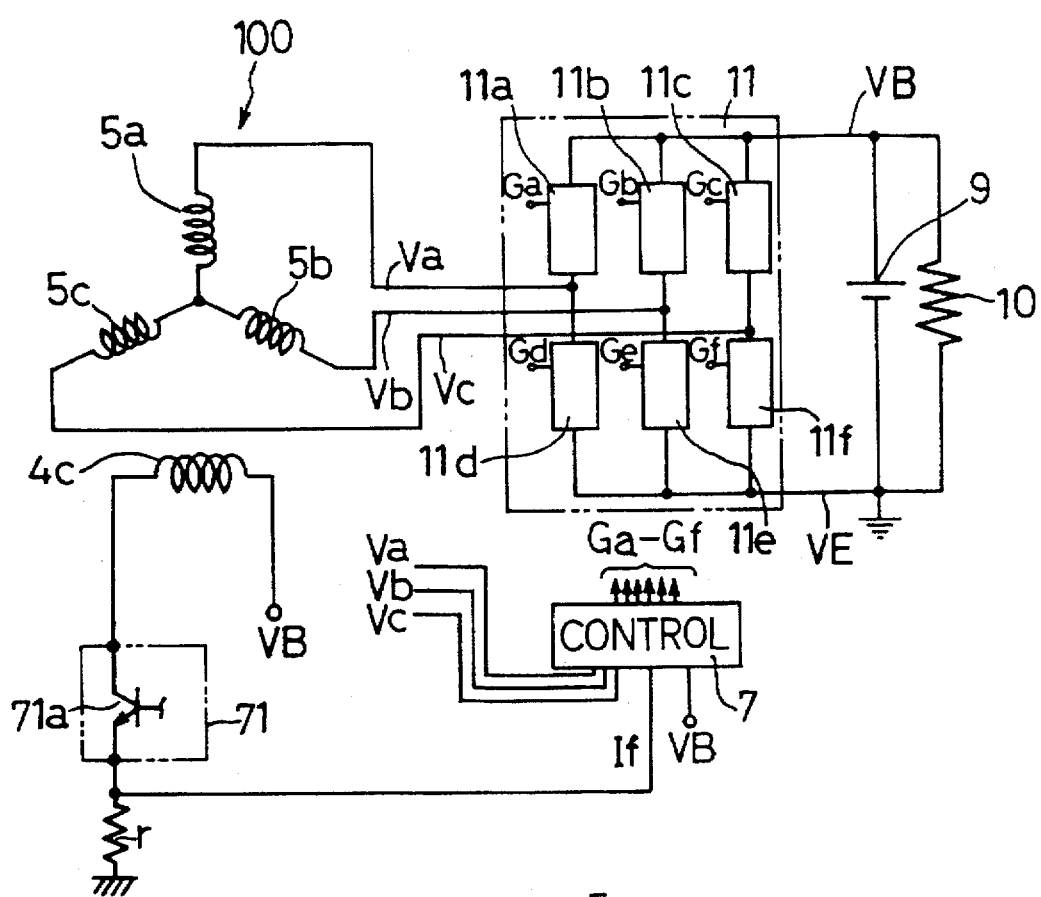
FIG. 1 is a block diagram of an embodiment of the AC power generating apparatus used for vehicles according to the invention.

This AC power generating apparatus is used for vehicles and comprises a three-phase synchronous power generator (alternator) 100 having Lundell-type field poles, a three-phase full-wave rectifier (two-way current switching circuit, inverter circuit) 11 for rectifying AC currents generated, a regulator 71 for controlling a field current, and a controller (controlling means) 7 for controlling the three-phase full-wave rectifier 11, as shown in FIG. 1.

Figure 2:
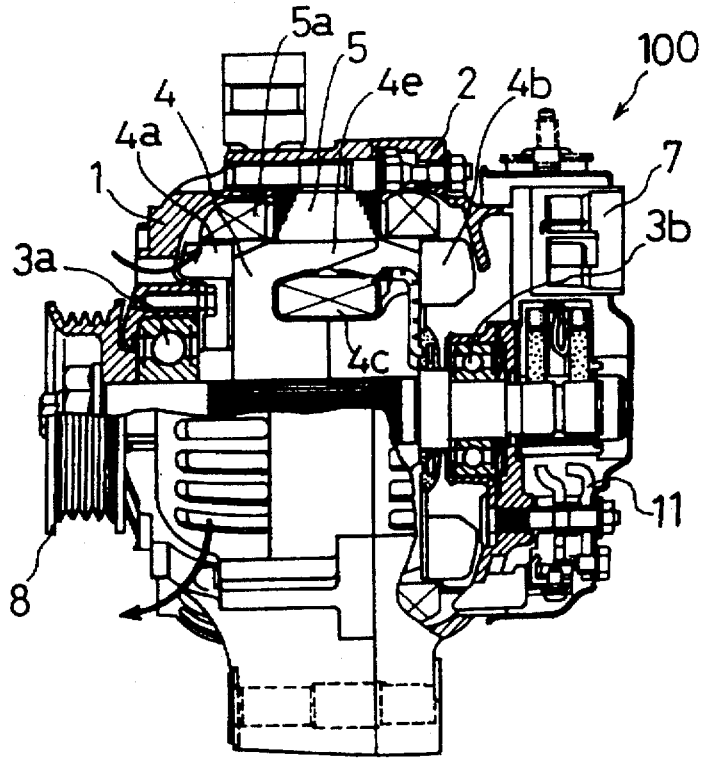
FIG. 2 is a sectional view of the three-phase synchronous power generator shown in FIG. 1.

The three-phase synchronous power generator 100 has a drive frame 1 and a rear frame 2 that rotatably support a rotor 4 by bearings 3a, 3b as shown in FIG. 2. Stator (armature) 5 is fixed to the drive frame 1, surrounding an outer peripheral surface of the rotor 4. The currents generated in armature coils (stator windings) 5a–5c of the stator 5 are rectified by the rectifier 11 composed of MOSFETs. The field current supplied to a field coil (rotor winding) 4c of the rotor 4 is controlled by the regulator 71. Cooling fans 4a, 4b are mounted to the opposite ends of a pole core 4e of the rotor 4. As well known, in the three-phase synchronous power generator 100, the regulator 71 supplies the required field current to the field coil 4c and the rotor 4 is rotated by an engine (not shown) via a pulley 8 to produce a revolving magnetic field so that three-phase AC voltages are induced in the armature coils 5a–5c. A resistor r is an insert resistor for detecting the field current. The voltage drop caused by the resistor r is inputted to the controller 7. The field current may also be estimated from the duty ratio of a switching transistor 71a provided in the regulator 71 for controlling the field current.

The controller 7, containing a microcomputer, PWM-controls the conduction rate of the field current If so that the battery voltage VB accords with a predetermined value of generated voltages, generates gate control signal voltages Ga–Gf based on the battery voltage VB and the output voltage of the armature coils 5a, 5b, 5c of the respective phases, and applies the gate control signal voltages Ga–Gf individually to gates of the SiC-MOSFETs 11a–11f.

The regulator 71 controls, to keep the battery voltage VB constant, the conduction of the switching transistor for controlling the field current on the basis of the comparison of the battery voltage VB with a reference voltage. The description thereof is well known and will be omitted here.

The three-phase full-wave rectifier 11 comprises the inverter circuit in which the SiC-MOSFETs 11a–11f are connected in a three-phase bridge circuit configuration as shown in FIG. 1. A high-level DC current output terminal of the three-phase full-wave rectifier 11 is connected to the high-level terminal of a battery 9 and to an end of an electric load 10. A low-level DC output terminal of the three-phase full-wave rectifier 11 is grounded together with the low-level terminal of the battery 9 and the other end of the electric load 10. The MOSFETs 11a–11c constitute high-side switches, and the MOSFETs 11d–11f constitute low-side switches.

Figure 3:
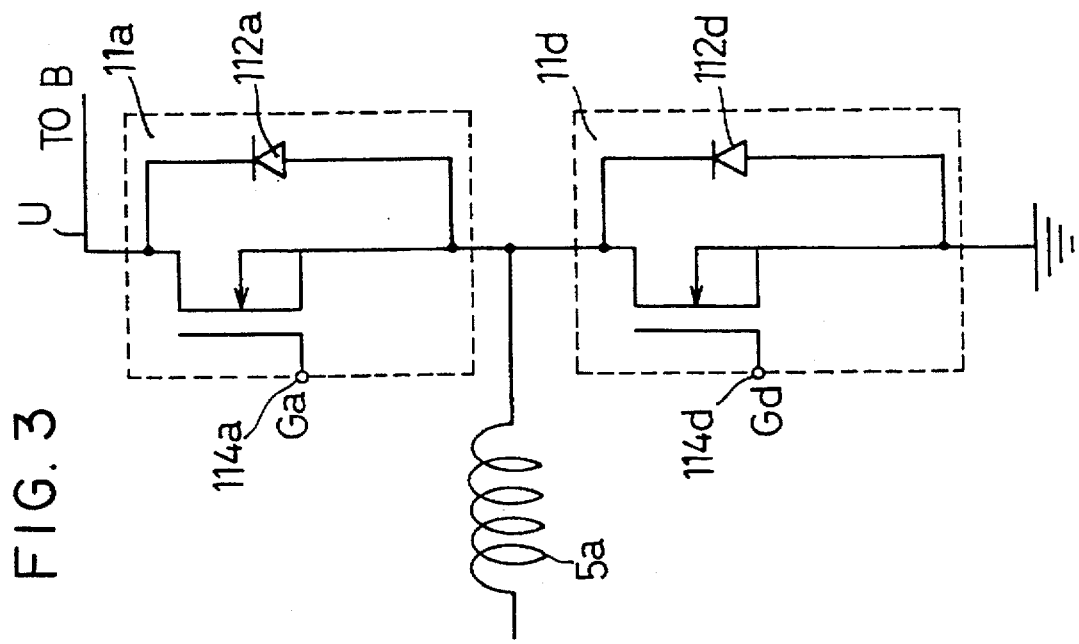
FIG. 3 is an equivalent circuit diagram illustrating a portion of one phase of the three-phase full-wave rectifier shown in FIG. 1.

A phase inverter circuit of the a-phase of the three-phase full-wave rectifier 11 will be described with reference to FIG. 3.

The high-side switch MOSFET 11a and the low-side switch MOSFET 11d are of N-channel type and interconnected in series. The MOSFET 11a has an N-type region formed at the armature coil side, that is, the drain region during power generation, and another N-type region formed at the battery side, that is, the source region during the power generation, and a P well region formed immediately under the gate electrode 114a. The PN junction between the P well region and the N-type regions forms a parasitic diode 112a. The parasitic diode 112a of the MOSFET 11a and the parasitic diode 112d of the MOSFET 11d also serve as current passage for supplying the generated current to the battery 9. The other MOSFETs 11b–11f are constructed in the same manner as the MOSFET 11a.

The switching timing of the MOSFETs 11a–11f of the three-phase full-wave rectifier 11 will next be described.

(Electromagnetic Force Pulsation Non-suppression Mode)

First, the mode in which the reverse current is not supplied will be described with reference to FIGS. 4A–4D.

The MOSFET 11a acting as the high-side switch of the a-phase that outputs the phase voltage Va is controlled as follows. It is examined whether the phase voltage Va (FIG. 4B) of the armature coil 5a is higher than the battery voltage VB and the other phase voltages Vb, Vc. If the phase voltage Va is higher, the MOSFET 11a is turned on (FIG. 4C). The MOSFET 11a is turned off when the phase voltage Va becomes lower than the battery voltage VB. The switching of the other high-side switches, the MOSFETs 11b, 11c, is controlled in generally the same manner.

The MOSFET 11d serving as the a-phase low-side switch is controlled as follows. It is examined whether the phase voltage Va of the armature coil 5a is lower than the ground voltage VE. If the phase voltage Va is lower, the MOSFET 11d is turned on (FIG. 4D). The MOSFET 11d is turned off when the phase voltage Va becomes higher than the ground voltage VE. The switching of the other low-side switches, the MOSFETs 11e, 11f, is controlled in generally the same manner.

(Electromagnetic Force Pulsation Suppression Mode)

The mode for supplying reverse current will be described. According to this embodiment, the inverter circuit of each phase alternately turns on the corresponding one of the MOSFETs 11a–11c (high-side switches) and the corresponding one of the MOSFETs 11a–11f (low-side switches). That is, the armature coil 5a is connected by either the MOSFET 11a or the MOSFET 11d to either the high-level DC power source terminal or the low-level DC power source terminal, and the armature coil 5b is connected by either the MOSFET 11b or the MOSFET 11e to either the high-level DC power source terminal or the low-level DC power source terminal, and the armature coil 5c is connected by either the MOSFET 11c or the MOSFET 11f to either the high-level DC power source terminal or the low-level DC power source terminal.

The switching control of the a-phase high-side switch 11a and the a-phase low-side switch 11d will be described with reference to FIGS. 5A–5D.

The high-side switch 11a is turned on (FIG. 5C) at time point t0, that is, after a time length T4 (=T2) from time point t2 when the phase current (FIG. 5A) of the armature coil 5a changes from negative to positive (starts to flow). The high-side switches, the MOSFETs 11b, 11c, are turned on in generally the same manner. More specifically, since the high-side switch 11a is off while the low-side switch 11d is on, the high-side switch 11a is turned on and the low-side switch 11d is turned off (FIG. 5D) at time point t0, that is, after the predetermined time length T4 from the electric potentials at the opposite ends of the low-side switch 11d (the source potential and the drain potential) become equal.

On the other hand, the low-side switch 11d is turned on at time point t1', that is, after the time length T2 (=T4) from time point t1 when the phase current of the armature coil 5a changes from positive to negative (starts to flow in). The low-side switches, the MOSFETs 11e, 11f, are turned on in generally the same manner. More specifically, since the low-side switch 11d is off while the high-side switch 11a is on, the low-side switch 11d is turned on and the high-side switch 11a is turned off at time point t1', that is, after the predetermined time length T2 from the electric potentials at the opposite ends of the high-side switch 11a (the source potential and the drain potential) become equal.

By controlling the switching operation in this manner, the delay of the timing of turning off the high-side switch 11a and the low-side switch 11d causes reverse current (the current flowing into the armature coil 5a through the high-side switch 11a and flowing out of the armature coil 5a through the low-side switch 11d, opposite to the generated current) to flow from the battery 9 to the armature coils 5a, 5b, 5c. As a result, the reverse current having the same frequency as the fundamental frequency m×p×n of the electromagnetic force pulsation is supplied to the generator, so that the electromagnetic force pulsation can be reduced and the vibration or noise can be suppressed as described later.

The operation and advantages of the switching control will be summarized as follows.

First, a phase current Ia, that is, opposite phase current, flows in such direction as to flow into the armature coil 5a for the predetermined length of time (for example, T2 as indicated in FIGS. 5A–5D).

If the opposite phase current has not been allowed to flow at time t1' when the predetermined length of time T2 elapses, the phase voltage Va is normally larger than the voltage of the low-level DC power source terminal (0 V in FIG. 1), and the low-side switch 11d of the diode connected to this load switch in parallel is not turned on. In this case, the armature current Ia is discontinued after the time t1'.

However, if the opposite phase current is allowed to flow from the high-side switch 11a to the armature coil 5a for the predetermined length of time T2, the counter electromotive force produced at the time t1' when the high-side switch 11a is turned off will occur in such direction as to reduce the electric potential of the output terminal of the armature coil 5a of this phase, that is, the phase voltage Va of this phase. Thus, the phase voltage Va decreases by the magnitude of the counter electromotive force so that the phase voltage Va decreases below the electric potential of the low-level DC power source terminal. As a result, the low-side switch 11d or the diode connected to this low-side switch 11d in parallel is turned on to allow the armature current Ia to continuously flow without interruption, thus suppressing the fluctuation of the armature current Ia and reducing the electromagnetic force pulsation.

The opposite phase current allowed to flow during the predetermined length of time T2, which does not flow during the opposite phase current off mode, causes buildup of electromagnetic energy in the armature coil 5a. Since this energy is released following the time t1', the generating capacity can also be increased.

Similarly, the low-side switch 11d is opened the predetermined length of time after the current flowing through the low-side switch 11d is reversed from such direction as to flow into the armature coil 5a to the direction in which current flows out thereof. Thereby, the fluctuation of the armature current will be suppressed and the electromagnetic force pulsation will be reduced for the same operation and advantages as described above.

It should be easily understood that the maximum value of the aforementioned predetermined length of time (the time length for supplying the opposite phase current) is the longest time (the maximum delay time) dependent on the rotational speed. In addition, it should be understood that the maximum delay time varies proportionally to the rotational speed since the period (electrical angle of $2\pi$) of the armature current Ia of each phase varies with the rotational speed. Furthermore, since the rising of the generated voltage of each phase becomes quicker as the rotational speed increases, an increase of the rotational speed further reduces the maximum delay time. Therefore, the control circuit may have a pre-stored map that indicates the relation between the maximum delay time (the longest time for supplying the reverse current) and the rotational speed. With such a map, if a delay time calculated is greater than the maximum delay time determined corresponding to the rotational speed introduced into the control circuit, the delay time can be fixed to the maximum delay time.

Figure 6:
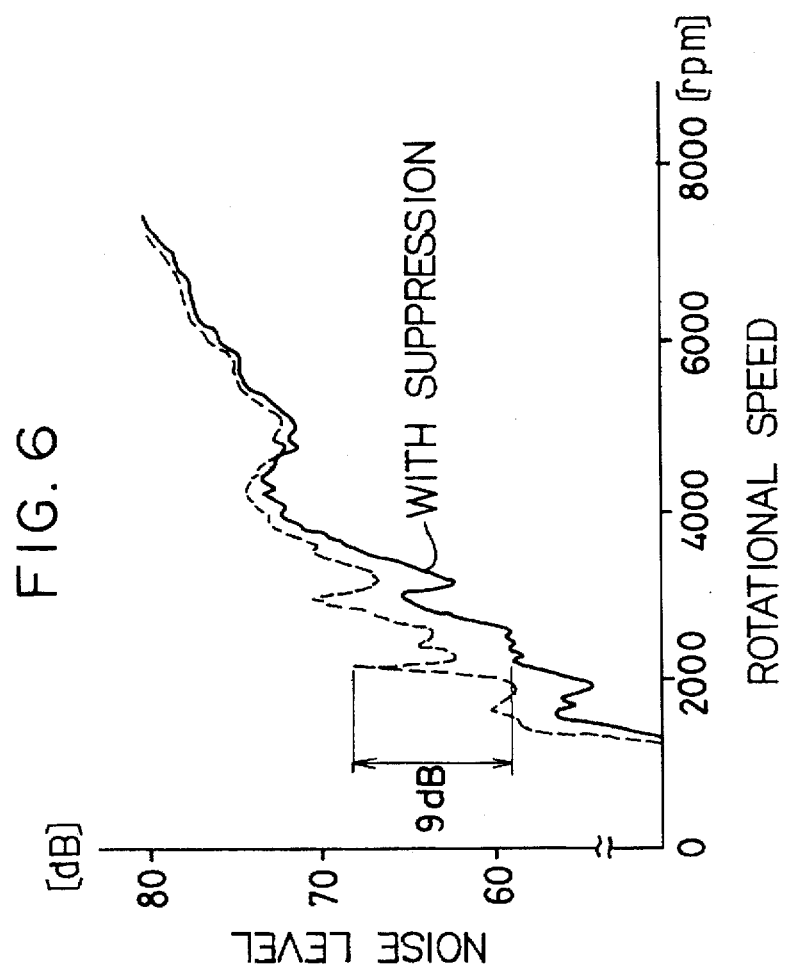
FIG. 6 is a graph indicating the relation between noise level and rotational speed when the electromotive force pulsation suppression mode according to the embodiment is performed, and when a diode rectification is performed.

More specifically, the waveform of the armature current of the alternator according to this embodiment shown in FIG. 5A is much more approximate to a sine wave than the waveform of the armature current shown in FIG. 4A. It can be understood that the revolving speed of the revolving magnetic field generated by the three-phase armature currents which are approximate to sine waves become stable, and that the electromagnetic force pulsation has a strong correlation with the fluctuation of the distance between the equivalent center of the revolving magnetic field and the pole center of the field pole (pole core) 4e. FIG. 6 indicates actually measured values indicating the relation between the noise level and the rotational speed when the generator is operated in the electromagnetic force pulsation suppression mode illustrated in FIGS. 5A–5D. The curve of broken line was obtained with a three-phase full-wave rectifier 11 having a diode-bridge arrangement under the same conditions as for the solid line curve. As indicated, the electromagnetic noise was reduced by 9 dB at 2400 rpm.

Figure 7:
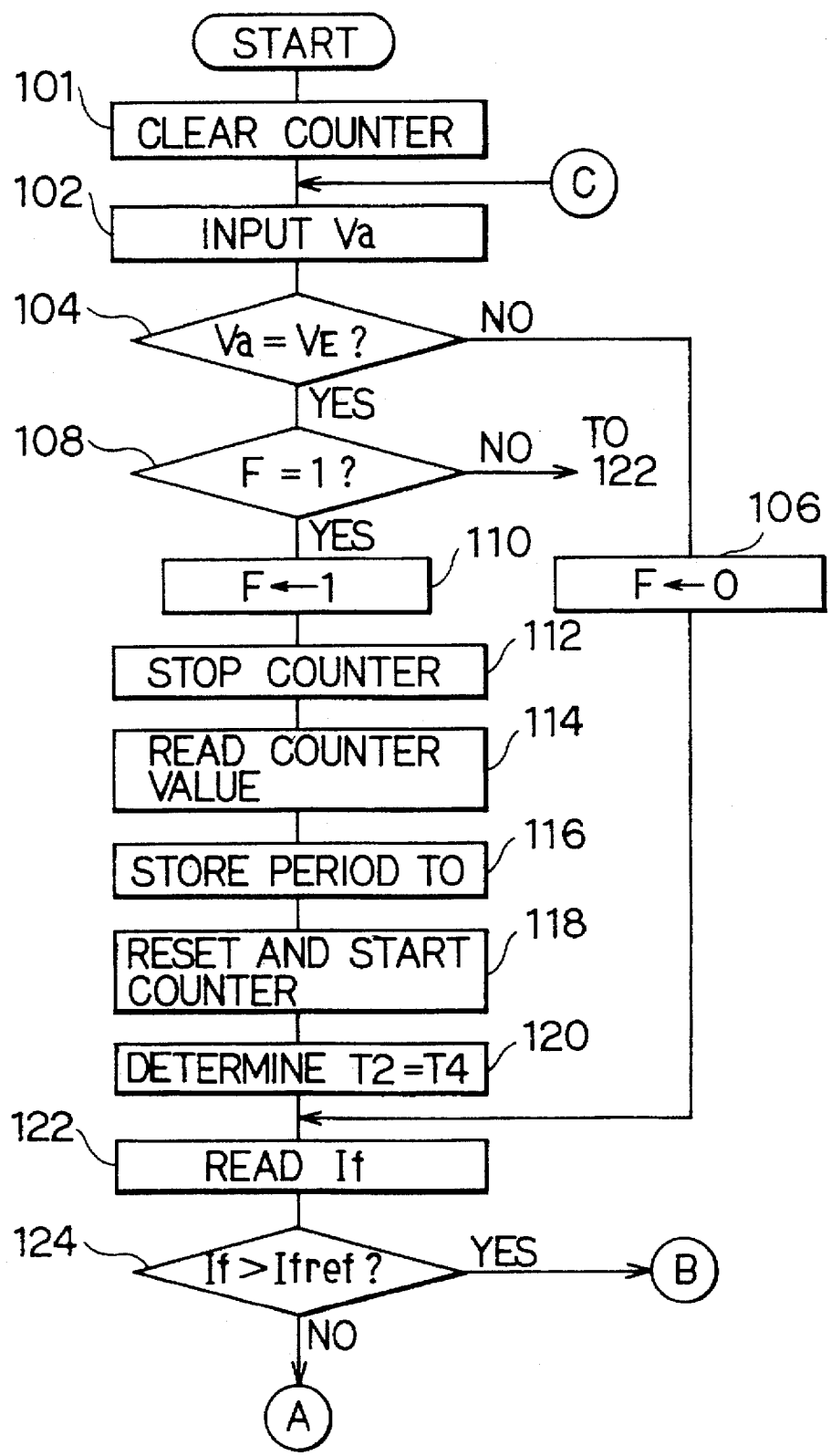
FIG. 7 is a flowchart illustrating a specific example of the operation of a controller according to Embodiment 1.

The actual control of the embodiment will be described with reference to the flowcharts shown in FIGS. 7–10. The flowchart of FIG. 7 illustrates the control operation for detecting electric power generation period corresponding to the power generation rotational speed and force saturation determination.

The control operation is performed by clearing a counter for counting the power generation period to 0 (step 101), inputting any phase voltage (for example, Va) of the three phase voltages (step 102), and determining whether the phase voltage Va is 0V (=VE) to detect the zero crossing point of the phase voltage Va (step 104). If the voltage Va is not 0 V, a flag F is set to 0 (step 106) and the operation jumps to step 122. If the voltage Va is 0 V, the flag F is checked whether it is 1 (step 108). If the flag F is not 1, the operation jumps to step 122. If the flag F is 1, the operation proceeds by setting the flag F to 1 (step 110), stopping the counter (step 112) and reading in the present counter value (step 114).

The flag F is used because of the following reason. Because step 104 actually determines whether the phase voltage Va is within a predetermined range approximate to 0, step 104 could determine that Va=0 V in two successive rounds of this routine, which will result in determination of an extremely short period. The use of the flag F prevents this erroneous determination.

The count value read in step 114 indicates the time interval (T1) between the previous zero-crossing point (to) and the present zero-crossing time (t1), that is, a period half the power generation period T0. This count value is doubled to obtain the period T0 which is then stored in memory (step 116). The counter is then reset to 0 and starts again (step 118). Then, the delay time T2=T4, that is, the time length for supplying opposite-phase current, is determined on the basis of the period T0 (step 120). According to this embodiment, the delay time T2=T4, (see FIGS. 5A–5D) is set to a fixed proportion of the period (To).

Subsequently, the field current If is read in on the basis of the voltage drop signal from the resistor r (step 122), and the field current If is compared with a predetermined field current value Ifref with which the rotor starts to become saturated (step 124). According to this embodiment, the value Ifref is experimentally determined to 60% of the maximum field current in normal cold condition. If step 124 determines that the rotor iron core is saturated with magnetic flux, the operation proceeds to step 300 (FIG. 9) to enter the armature current control mode (electromagnetic force pulsation suppression mode). If step 124 determines otherwise, the operation proceeds to step 200 (FIG. 8) to enter the armature current non-control mode (electromagnetic force pulsation non-suppression mode).

Figure 8:
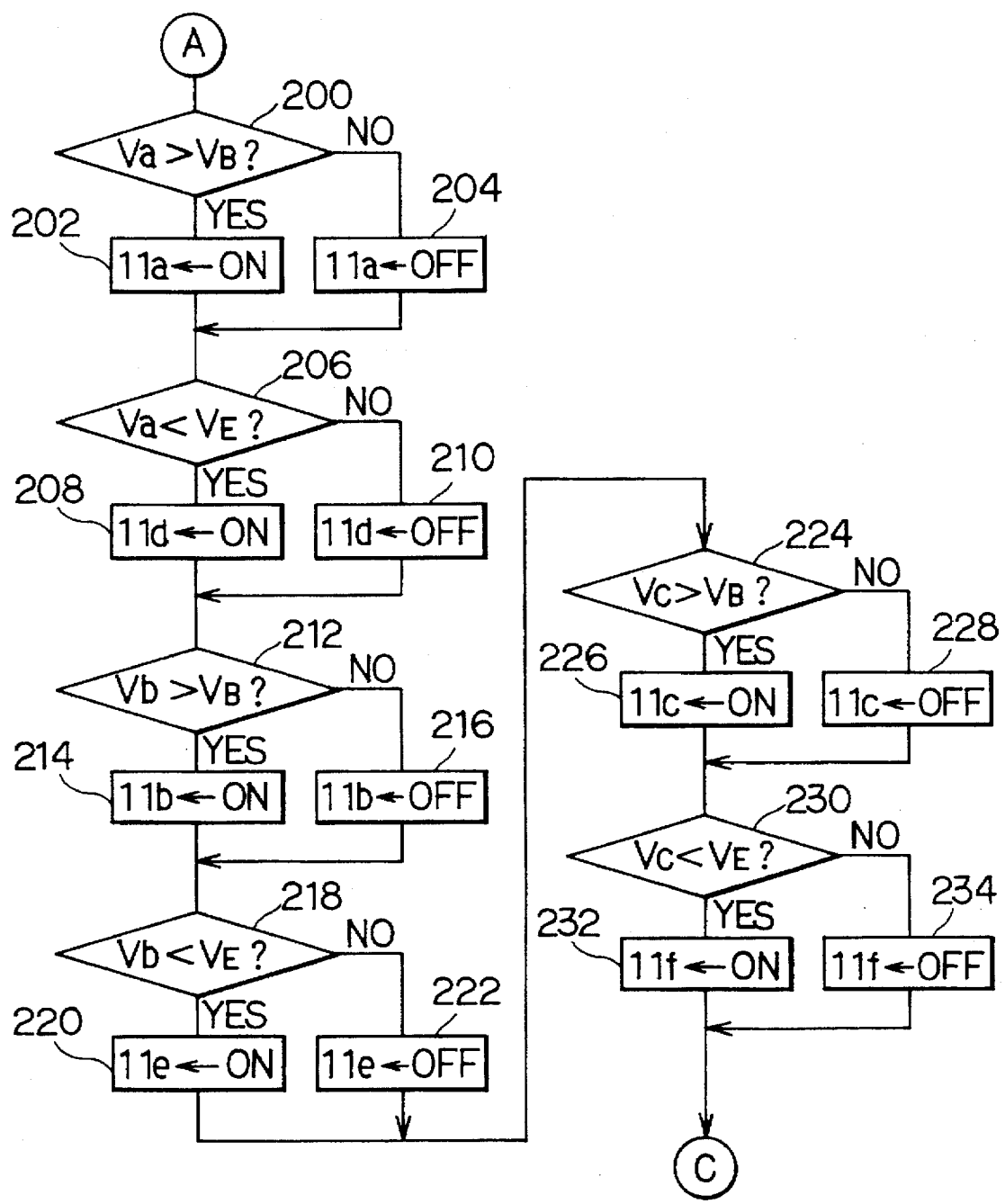
FIG. 8 is a flowchart illustrating a specific example of the operation of the controller according to Embodiment 1.

The routine for executing the electromagnetic force pulsation non-suppression mode will be described with reference to the flowchart of FIG. 8.

The routine is performed by first examining whether the phase voltage Va of the a-phase is greater than the battery voltage VB (step 200). The high-side switch 11a (step 202) is turned on if the voltage Va is greater, and is turned off (step 204) if it is equal to or lower than the battery voltage VB. Then, it is examined whether the phase voltage Va of the a-phase is lower than 0 V, that is, the potential of the battery low-level terminal (step 206). If it is lower, the low-side switch 11d is turned on (step 208). If it is not lower than 0 V, the low-side switch 11d is turned off (step 210).

Then, it is examined whether the phase voltage Vb of the b-phase is greater than the battery voltage VB (step 212). If the voltage Vb is greater, the high-side switch 11b is turned on (step 214). If it is equal to or lower than the battery voltage VB, the high-side switch 11b is turned off (step 216). Then, it is examined whether the phase voltage Vb of the b-phase is lower than 0 V, that is, the potential of the battery low-level terminal (step 218). If it is lower, the low-side switch 11e is turned on (step 220). If it is not lower than 0 V, the low-side switch 11e is turned off (step 222).

Then, it is examined whether the phase voltage Vc of the c-phase is greater than the battery voltage VB (step 224). If the voltage Vb is greater, the high-side switch 11c is turned on (step 226). If it is equal to or lower than the battery voltage VB, the high-side switch 11c is turned off (step 228). Then, it is examined whether the phase voltage Vc of the c-phase is lower than 0 V, that is, the potential of the battery low-level terminal (step 230). If it is lower, the low-side switch 11f is turned on (step 232). If it is not lower than 0 V, the low-side switch 11f is turned off (step 234). The operation then proceeds to step 102.

Figure 9:
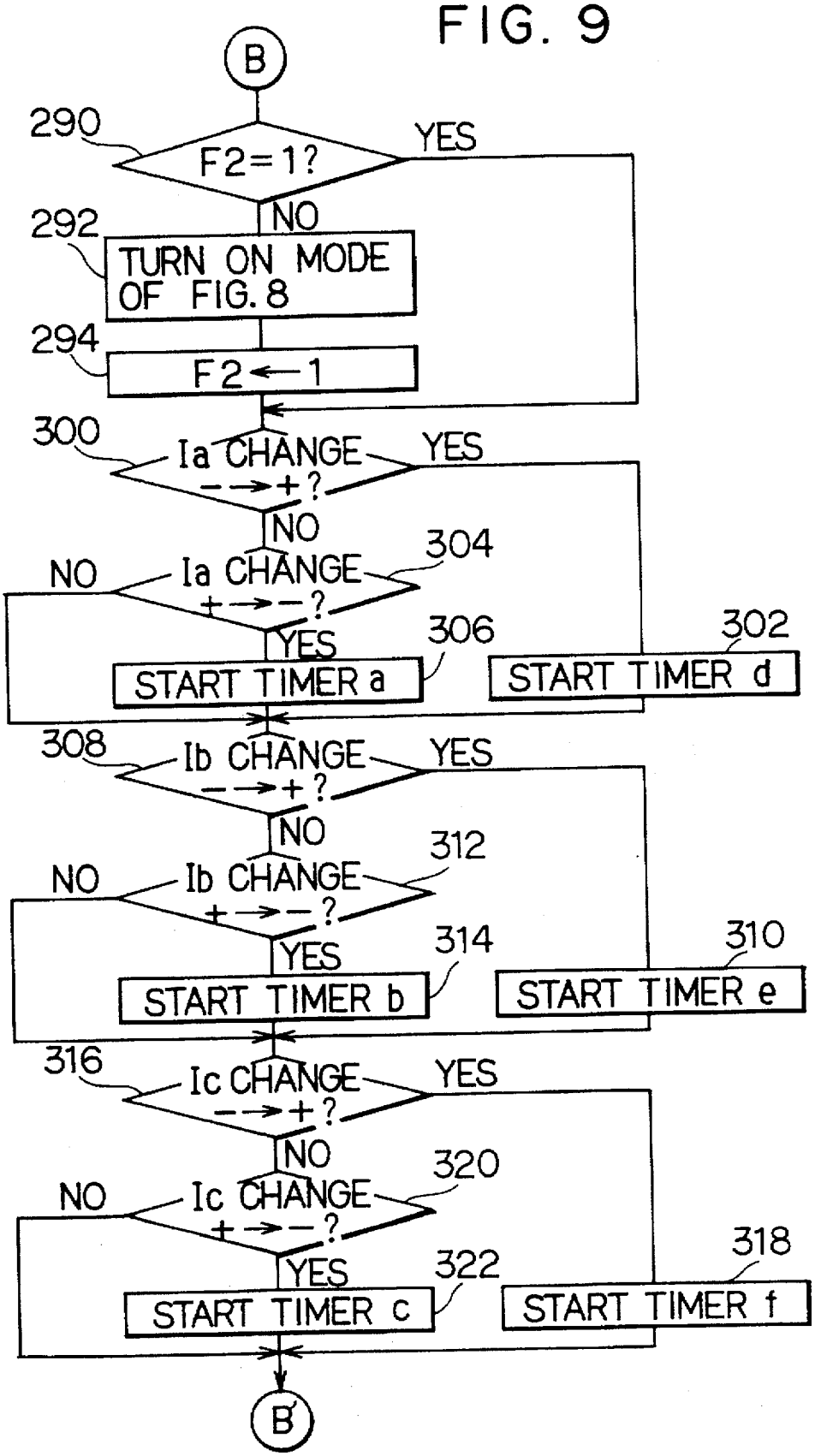
FIG. 9 is a flowchart illustrating a specific example of the operation of the controller according to Embodiment 1.
Figure 10:
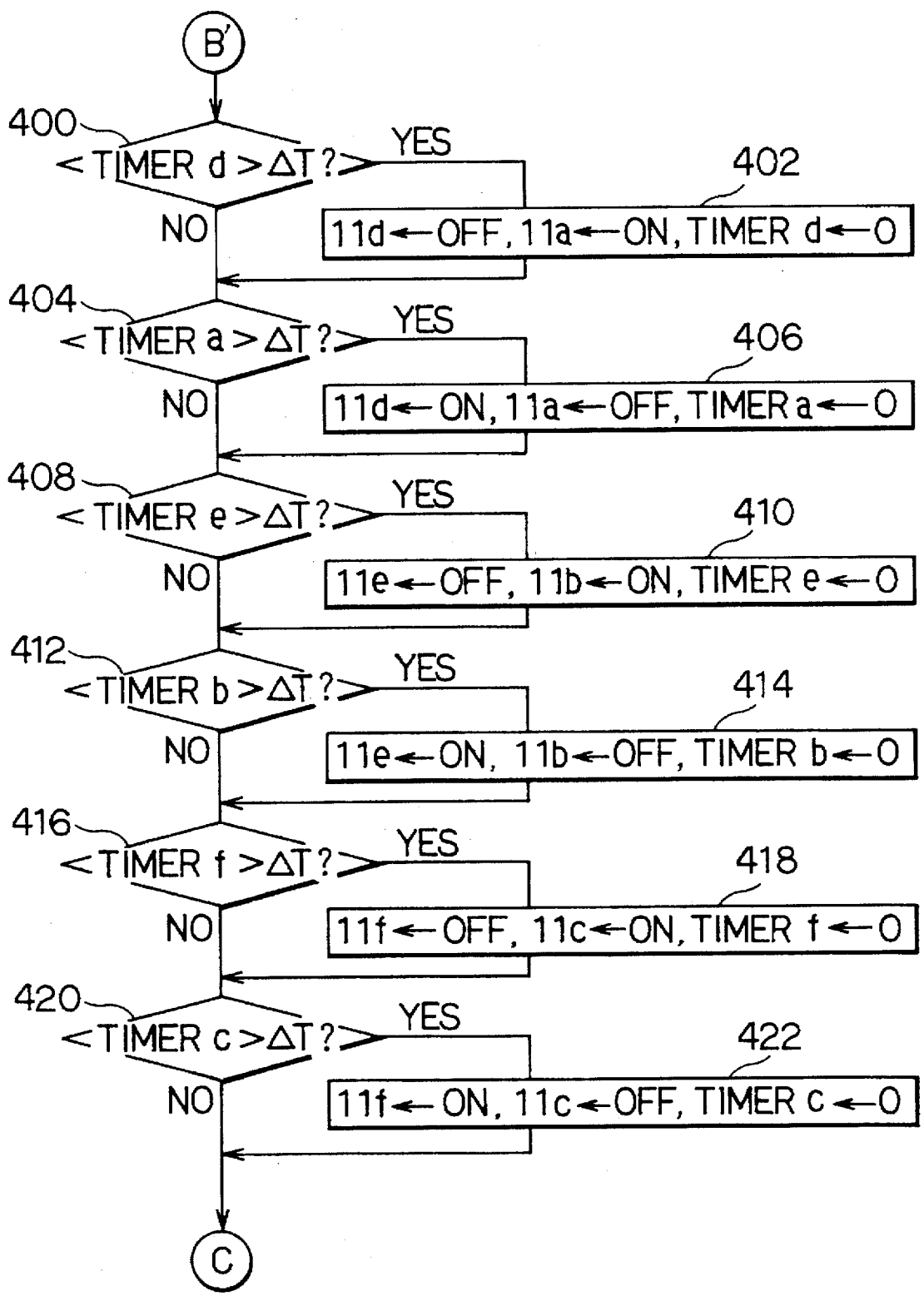
FIG. 10 is a flowchart illustrating a specific example of the operation of the controller according to Embodiment 1.

The routine for executing the electromagnetic force pulsation suppression mode will be described with reference to the flowcharts shown in FIGS. 9 and 10. FIG. 9 illustrates the routine for determining the zero-crossing point. FIG. 10 illustrates the routine for controlling the switching operation of the MOSFETs 11a–11f.

First, it is examined whether a flag F2 has been set to 1. The flag F2 indicates whether this routine is going to be performed for the first time or has been performed once or more (step 290). If this routine has been performed once or more (F2=1), the operation jumps to step 300. If this routine is going to be performed for the first time (F2=0), only the energization (turning on) of the MOSFETs 11a–11f is performed according to the routine illustrated in FIG. 8 (step 292). After setting the flag F2 to 1 (step 294), the operation proceeds to step 300. The flag F2 has been reset to 0 when application of the battery voltage is started.

Step 300 examines whether the voltage Va has become equal to or greater than 0 V during closure of the low-side switch 11d to determine whether the current through the low-side switch 11d, that is, the armature current Ia, has changed from negative to positive, that is, from the direction in which current flows into the armature coil 5a to the direction in which current flows out into the low-side DC power terminal (0 V). If the current direction has changed, a built-in timer d is started (step 302). If it has not changed, it is examined whether Va has become equal to or lower than VB during closure of the high-side switch 11a to determine whether the current through the high-side switch 11a, that is, the armature current Ia, has changed from positive to negative, that is, from the direction in which current flows out of the armature coil 5a into the high-side DC power terminal to the direction in which current flows into the armature coil 5a (step 304). If the current direction has changed, a built-in timer a is started (step 306). If it has not changed, the operation proceeds to step 308.

Step 308 examines whether the voltage Vb has become equal to or greater than 0 V during closure of the low-side switch 11e to determine whether the current through the low-side switch 11e, that is, the armature current Ib, has changed from negative to positive, that is, from the direction in which current flows into the armature coil 5b to the direction in which current flows out into the low-side DC power terminal (0 V). If the current direction has changed, a built-in timer e is started (step 310). If it has not changed, it is examined whether Vb has become equal to or lower than VB during closure of the high-side switch 11b to determine whether the current through the high-side switch 11b, that is, the armature current Ib, has changed from positive to negative, that is, from the direction in which current flows out of the armature coil 5b into the high-side DC power terminal to the direction in which current flows into the armature coil 5b (step 312). If the current direction has changed, the built-in timer b is started (step 314). If it has not changed, the operation proceeds to step 316.

Step 316 examines whether the voltage Vc has become equal to or greater than 0 V during closure of the low-side switch 11f to determine whether the current through the low-side switch 11f, that is, the armature current Ic, has changed from negative to positive, that is, from the direction in which current flows into the armature coil 5c to the direction in which current flows out into the low-side DC power terminal (0 V). If the current direction has changed, a built-in timer f is started (step 318). If it has not changed, it is examined whether Vc has become equal to or lower than VB during closure of the high-side switch 11c to determine whether the current through the high-side switch 11c, that is, the armature current Ic, has changed from positive to negative, that is, from the direction in which current flows out of the armature coil 5c into the high-side DC power terminal to the direction in which current flows into the armature coil 5c (step 320). If the current direction has changed, the built-in timer c is started (step 322). If it has not changed, the operation proceeds to step 400.

Step 400 examines whether the timer d has timed out, that is, whether a predetermined delay time $\Delta T = T2 = T4$ (see FIG. 5D) has elapsed. If the timer d has not timed out, the operation immediately proceeds to step 404. If the timer d has timed out, then the low-side switch 11d is turned off, the high-side switch 11a is turned on, and the timer d is reset to 0. The operation then proceeds to step 404.

Step 404 examines whether the timer a has timed out, that is, whether the predetermined delay time $\Delta T = T2 = T4$ (see FIG. 5D) has elapsed. If the timer a has not timed out, the operation immediately proceeds to step 408. If the timer a has timed out, then the low-side switch 11d is turned on, the high-side switch 11a is turned off, and the timer a is reset to 0. The operation then proceeds to step 408.

Step 408 examines whether the timer e has timed out, that is, whether the predetermined delay time $\Delta T = T2 = T4$ (see FIG. 5D) has elapsed. If the timer e has not timed out, the operation immediately proceeds to step 412. If the timer e has timed out, then the low-side switch 11e is turned off, the high-side switch 11b is turned on, and the timer e is reset to 0. The operation then proceeds to step 412.

Step 412 examines whether the timer b has timed out, that is, whether the predetermined delay time $\Delta T = T2 = T4$ (see FIG. 5D) has elapsed. If the timer b has not timed out, the operation immediately proceeds to step 416. If the timer b has timed out, then the low-side switch 11e is turned on, the high-side switch 11b is turned off, and the timer b is reset to 0. The operation then proceeds to step 416.

Step 416 examines whether the timer f has timed out, that is, whether the predetermined delay time $\Delta T = T2 = T4$ (see FIG. 5D) has elapsed. If the timer f has not timed out, the operation immediately proceeds to step 420. If the timer f has timed out, then the low-side switch 11f is turned off, the high-side switch 11c is turned on, and the timer f is reset to 0. The operation then proceeds to step 420.

Step 420 examines whether the timer c has timed out, that is, whether the predetermined delay time $\Delta T = T2 = T4$ (see FIG. 5D) has elapsed. If the timer c has not timed out, the operation immediately proceeds to step 102. If the timer c has timed out, then the low-side switch 11f is turned on, the high-side switch 11c is turned off, and the timer c is reset to 0. The operation then proceeds to step 102.

Although according to this embodiment each of the switches 11a–11f is closed (turned on) for a duration of electric angle of 180°, the closure duration may be less than 180°. In such a case, since a duration when both the high-side switch and the low-side switch of the respective phase inverter are off occurs, the following control should be performed.

The description will be made in conjunction with, for example, the a-phase. If the phase voltage Va of the armature coil 5a of the a-phase becomes higher than the battery voltage VB during disconnection of both the high-side switch 11a and the low-side switch 11d, the high-side switch 11a is turned on. The high-side switch 11a thus turned on should be turned off after the predetermined delay time $\Delta T$ from the phase voltage Va becomes lower than the battery voltage VB, as described above.

Similarly, if the phase voltage Va becomes lower than the ground potential during disconnection of both the high-side switch 11a and the low-side switch 11d, the low-side switch 11d will be turned on. The low-side switch 11d thus turned on should be turned off after the predetermined delay time $\Delta T$ from when the phase voltage Va becomes lower than the battery voltage VB, as described above. The control over the b-phase and the c-phase can be performed in the same manner. Alternatively, the element switching operation control of the circuit 11 described above may be performed only over the a-phase while the control of the switches 11b, 11c, 11e and 11f of the b and c-phases is shifted 120° in timing from the control over the a-phase.

Since the above control operation detects the field current If and saturation of the iron core and thereby supplies reverse current only when large noise is produced, the increase of the copper loss caused by the opposite-phase armature current conduction can be avoided. The control operation can also detect the rotational speed based on the phase voltage Va and perform the conduction of reverse current only when the rotational speed is within a rotational speed range predetermined beforehand such that the vibration or noise caused by the corresponding electromagnetic force becomes large.

In addition, if the time point when the armature current becomes 0 is detected, the starting point of the electromagnetic force ripple synchronous with that time point can be detected. Thus, such procedure will enable the determination of the time point of turning on or off the switches 11a–11f, that is, after the predetermined delay time from that time point at which the armature current becomes 0.

The advantages of this embodiment will next be described. FIGS. 11A–11D indicates time changes of the armature currents Ia–Ic of the three phases and the electromagnetic force N occurring in the nail-like pole (pole core) 4e in terms of electric phase when the electromagnetic force pulsation suppression mode according to this embodiment is performed. The broken lines indicate in electric phase angles the characteristics exhibited when the diode rectification is provided.

Figure 12A:
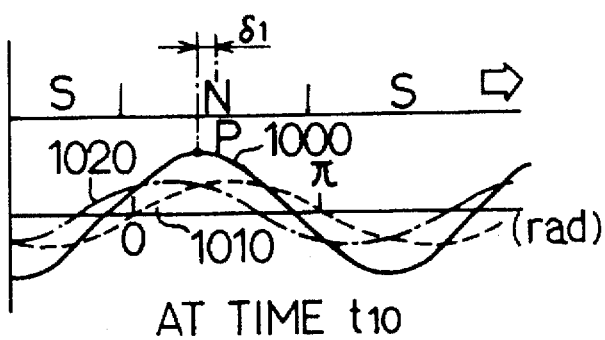
FIGS. 12A–12C indicate the distribution of reaction magnetomotive forces at time points indicated in FIGS. 11A–11D.
Figure 13A:
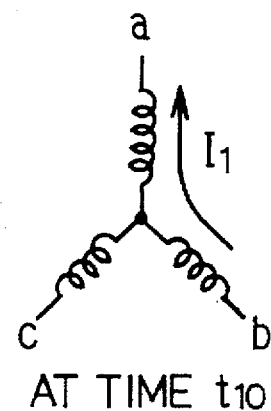
FIGS. 13A–13C illustrate the patterns of armature current flow at the time points indicated in FIGS. 11–11D.
Figure 12B:
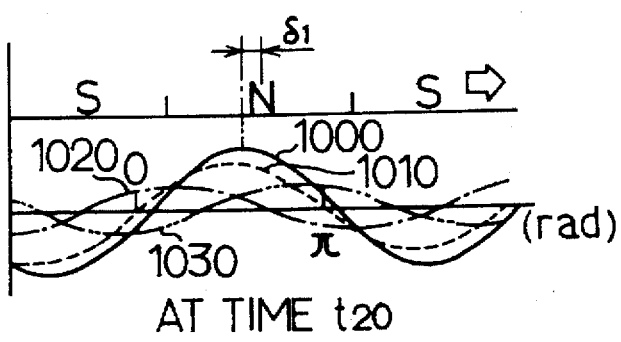
Figure 13B:
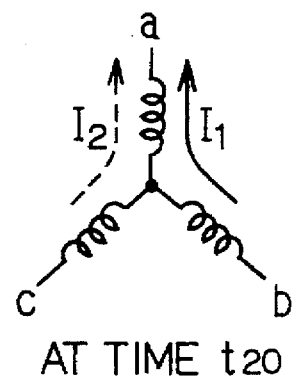
Figure 12C:
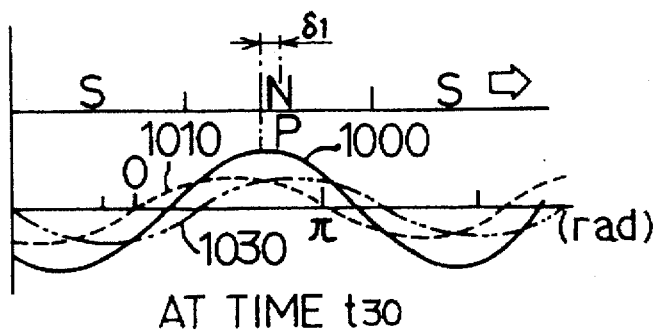
Figure 13C:
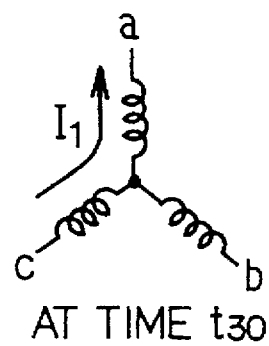

FIGS. 12A–12C indicate the positions of the rotor and the distribution of reaction magnetomotive force occurring at respective time points t10–t30 under the same conditions as above, and FIGS. 13A–13C indicate patterns of current flow. In the figures, reference numeral 1000 denotes the distribution of resultant composite magnetomotive force; 1010 denotes the distribution of reaction magnetomotive force by the a-phase; 1020 denotes the distribution of reaction magnetomotive force by the b-phase; and 1030 denotes the distribution of reaction magnetomotive force by the opposite-phase armature current by the c-phase.

According to this embodiment, since either one of the high-side switch or the low-side switch of the inverter circuit 11 of each phase is on all the time, the armature currents Ia, Ib, Ic continuously flow as indicated in FIG. 5A. The distribution of reaction magnetomotive force in this case will be described in conjunction with time point t20. As the reverse current I2 with respect to the current I1 occurring when the diode rectification is introduced, the resultant magnetomotive force distribution 1000 shifts in the progressing direction, the interval between the center P of the resultant magnetomotive force distribution 1000 and the center of the rotor pole becomes d1 as in the cases of time points t10 and t30. That is, the introduction of the current of the reversed direction forms a smooth progressing magnetic field such that the position of the reaction magnetomotive force relative to the magnetic pole remains unchanged, that is, constant, over time, thereby reducing the electromagnetic force ripple. Thus, the vibration of the nail-like pole 4e caused by the electromagnetic force ripple is reduced and, accordingly, the magnetic noise will be reduced. A low noise AC generator will thus be provided, which in turn will reduce electromagnetic noise without requiring a large-scale soundproof wall or any special process and without causing reduction of output performance or size increase of products. Although this embodiment detects the armature current based on the armature voltage, the current may be detected by, for example, using a low-resistance resistor connected in series with the MOSFETs 11a–11f.

The operation and advantages of the embodiment will be further described in detail below.

The general mechanism of generation of electromagnetic noise in the electric power generator will first be described. FIGS. 14A–14D are timing charts indicating time changes of the armature currents of the three phases and the electromagnetic force occurring in the magnetic poles at 2000 rpm. in terms of electric phase, where the voltages generated by the alternator are rectified by the diode rectifier.

It is proved that the electromagnetic force pulsates synchronously with the duration when the armature current of one of the phase remains 0 (that is, duration when the armature current is interrupted). This electromagnetic force ripple has a frequency of m×p×n where m is the number of phases, p is the number of poles, and n is rotational speed per second. The relation of positions between the armature reaction and the rotor position is analyzed, assuming that the time t10 indicates the starting of the electromagnetic force pulsation, the time 20 indicates the end thereof, and the time t3 indicates the restart thereof.

Figure 15A:
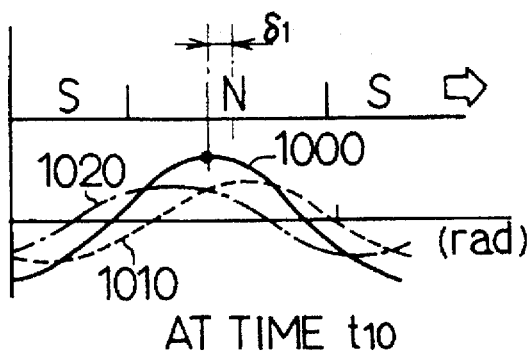
FIGS. 15A–15C indicate the distributions of reaction magnetomotive force at time points indicated in FIGS. 14A–14D.
Figure 15B:
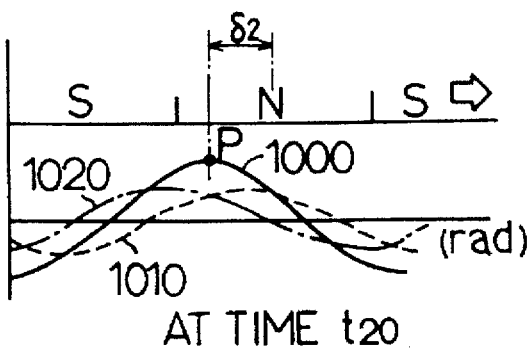
Figure 15C:
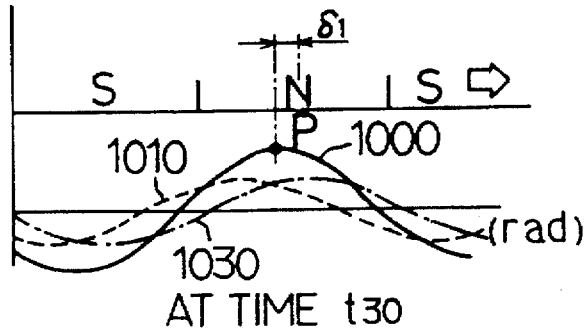

FIGS. 15A–15C indicate the rotor positions and the distribution of the reaction magnetomotive force of the armature at the respective time points, with the position of the armature being fixed. The horizontal axis in each figure indicates the position of the armature in terms of electrical angle phase.

Figure 16A:
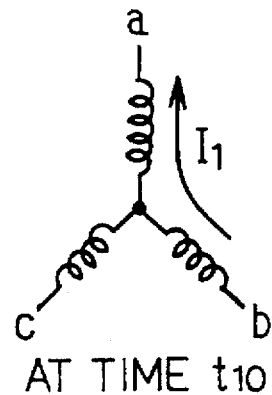
FIGS. 16A–16C illustrate the patterns of armature current flow at the time points indicated in FIGS. 14A–14D.
Figure 16B:
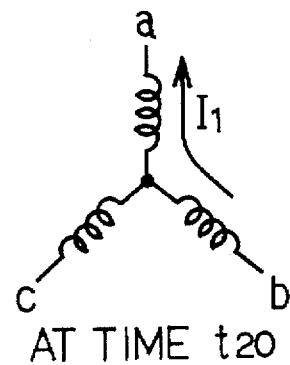
Figure 16C:
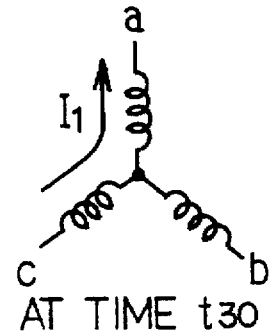

The magnetomotive force distribution is assumed herein to be a sine wave to indicate the armature reaction magnetomotive force. FIGS. 16A–16C indicate the patterns of current flow. Since current does not occur in the c-phase during time t10–t20, the resultant magnetomotive force 1000 is provided only by the reaction magnetomotive force distribution 1000 by the a-phase and the reaction magnetomotive force distribution 100 by the b-phase during that time. Further, during that time, since the current Ia occurring in the a-phase and the current Ib occurring in the b-phase are the same, the resultant magnetomotive force 1000 stays at the same position. However, since the rotor rotates at a constant speed, the interval between the center of the rotor pole and the center P of the resultant magnetomotive force changes from δ1 to δ2. Thus, since the position of the reaction magnetomotive force relative to the magnetic pole changes, the electromagnetic force drastically decreases. At the time t30, since current occurs only in the a-phase and c-phase, the resultant magnetomotive force is provided by the a-phase and c-phase and shifts to a position in which phase has advanced by π/m (π/3 if the number of phases is three) relative to the time t10 so that the center interval becomes δ1 again.

Figure 14A:
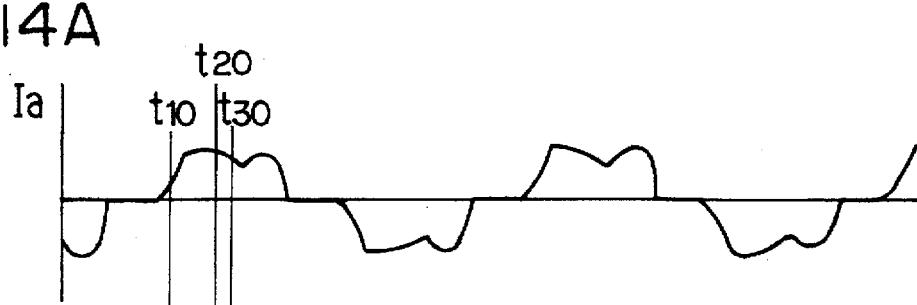
FIGS. 14A–14D are timing charts indicating the electromagnetic force pulsations when the diode rectification is performed.
Figure 14B:
Figure 14C:
Figure 14D:
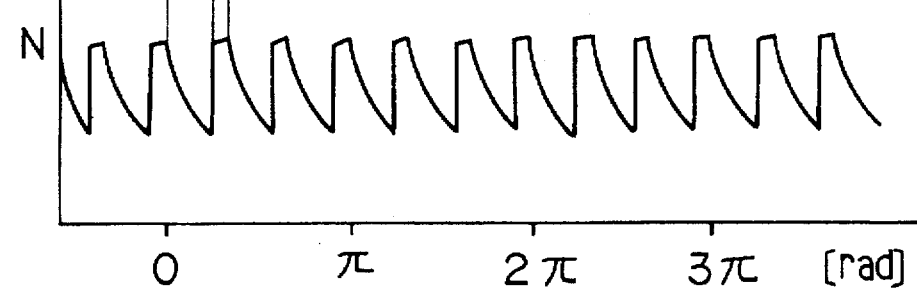

In view of the above description, the electromotive force ripple having a frequency of m×p×n and a period of π/m of the saw-tooth waveform in which the electromagnetic force decreases during the armature current interrupted duration as indicated in FIG. 14D is produced. Further, since the waveform is not a sine waveform, it is considered that a vibrating force having a high-frequency component of an integer multiple of that frequency will be produced.

Figure 17:
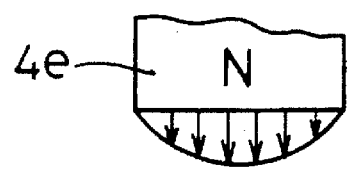
FIG. 17 indicates the distribution of electromagnetic force when the pole core is not saturated.
Figure 18:
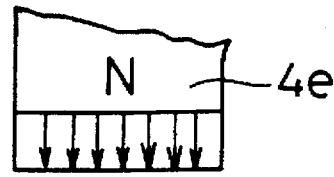
FIG. 18 indicates the distribution of electromagnetic force when the pole core is saturated.

The magnetomotive force generated by the nail-like poles 4e is in the rectangular form of magnetomotive force distribution with its maximum at the center as shown in FIG. 17, when the iron core is saturated. This change in the distribution form will further increase the electromagnetic force change. In the case of product design according to the generally accepted design method, the iron core will saturate with the application of the field current in excess of about 60% and produce remarkable tendency of noise generation.

Figure 19:
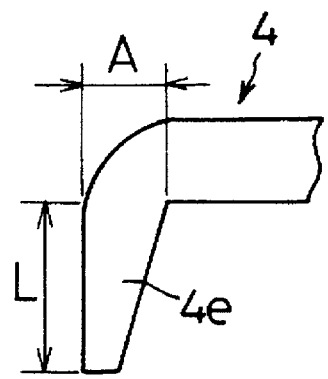
FIG. 19 is a schematic side view of the pole core.
Figure 20:
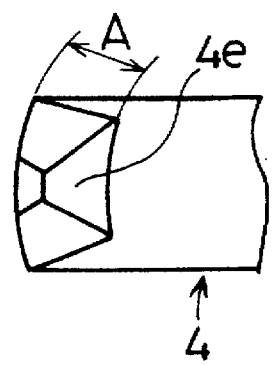
FIG. 20 is a schematic front view of the pole core.
Figure 21:
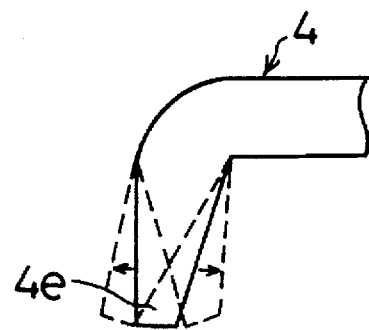
FIG. 21 illustrates a vibrating state of the pole core.

As the electromagnetic force occurring between the armature and the Lundell-type field core 4 having nail-like magnetic poles as shown in FIGS. 19–21 changes, the pole nail 4e deforms as indicated by the broken line in FIG. 21 and large vibration is produced particularly if the frequency of electromagnetic force and the resonance frequency of the nail pole coincide. The resonance frequency of the nail pole is expressed by:

$$f=kL^{-2}(I/A)^{1/2}$$

where L is the length of the nail, A is a cross-sectional area of the nail, k is a constant, and I is the second moment of the cross-section. By rectangular prallelopiped approximation of the section of the nail, the equation can be written as:

$$f=k'L^{-2}(A/L)$$

Since the shapes of pole cores become generally similar shapes if the section of the magnetic path and the coil space are designed in accordance with the product size, (A/I) becomes a constant value. Therefore, the resonance frequency of the nail pole depends only on the length L of the nail pole. If an AC power generating apparatus of 0.6–1.6 kw is designed, the nail length becomes within a range of 20 mm–30 mm and, accordingly, the resonance frequency of the nail-like poles become within a range of 5000–7000 Hz. It will be difficult to drastically change this characteristic without degrading the output performance.

For example, if an AC power generating apparatus having a nail resonance frequency of 6000 Hz is operated at 1500–12000 rpm corresponding to the engine speed, the frequency m×p×n of the electromagnetic force ripple becomes 900–7200 Hz if the generator is of three-phase 12-pole type. In such a generator, the resonance of the nail will occur at 10000 rpm (6000 Hz). Further, since the electromagnetic force ripple has high-frequency components, the nail resonance will also occur if an integer multiple of the electromagnetic force ripple becomes 6000 Hz. For example, at 2500 rpm (1500 Hz), 3333 rpm (2000 Hz), or 5000 rpm (3000 Hz), an integer multiple of the frequency of electromagnetic force becomes equal to the nail resonance frequency to cause the nail pole to violently vibrate and produce large magnetic noise. Particularly in a low-speed region, since the generated voltage is low and the duration of interruption of armature current is long, the electromagnetic force ripple becomes large and the produced noise also becomes large.

For the above reasons, the electromagnetic force pulsation suppression mode according to this embodiment may be selectively performed for specific frequency ranges where the vibration becomes large. It is also effective to strengthen the electromagnetic force pulsation suppress mode for such frequency ranges compared with for other frequency ranges.

(Modifications)

While the above embodiment determines the switching timings based on the state of electric potential of the individual switches 11a–11b, the invention is not limited to it. For example, if a pole position detector 16 is provided for detecting the pole position of the rotor, the switching operation of the switches 11a–11f can be controlled on the basis of the pole position of the rotor.

While the above description has been made in connection with the three-phase synchronous power generator, it should be understood that the power generation technology of the reverse current supply type of the present invention can also be applied to more than three-phase synchronous power generators.

What is claimed is:

1. An AC power generating apparatus for charging a battery, comprising:

an AC power generator having multi-phase armature coils and a Lundell-type field pole;

AC-DC converting means having semiconductor switching elements respectively connected between the armature coils and the battery, the AC-DC converting means being constructed to enable current flow from the armature coils to the battery and current flow from the battery to the armature coils;

rotational speed detecting means for detecting a physical quantity related to rotational speed of the generator;

phase detecting means for detecting a physical quantity related to phase of an electromotive force generated from the armature coils; and control means for generating control signals on the basis of the physical quantities related to the rotational speed and the phase that control an on-off switch operation of the semiconductor switching elements of the AC-DC converting means when the generator is in an electric power generating operation, the control means generating the control signals to rectify electric power generated from the generator for supplying a charge current to the battery and to supply a discharge current from the battery to the armature coils for suppressing a fluctuation of an electromagnetic force caused by the on-off switch operation of the semiconductor switching elements when the charge current to the battery is switched off.

2. An AC power generating apparatus according to claim 1, wherein:

the control means is constructed to generate the control signals for supplying the discharge current from the battery to the armature coils, a fundamental frequency of the discharge current being m×p×n with m being number of phases, p being number of poles, and n being rotational speed per second.

3. An AC power generating apparatus according to claim 1, wherein:

the control means is constructed to generate the control signals for supplying the discharge current from the battery to the armature coils during all periods when the charge current from the armature coils to the battery is switched off.

4. An AC power generating apparatus according to claim 1, wherein:

the phase detecting means detects one armature voltage across the armature coils; and the control means controls supply of the discharge current of the battery by controlling the AC-DC converting means on the basis of the detected armature voltage.

5. An AC power generating apparatus according to claim 1, wherein:

the control means determines whether a field current supplied to a field coil provided around the field pole exceeds a predetermined value; and the control means performs supply of the discharge current by controlling the AC-DC converting means, if the detected field current exceeds the predetermined value.

6. An AC power generating apparatus for charging a battery, comprising:

an AC power generator having multi-phase armature coils and a Lundell-type field pole;

AC-DC converting means for rectifying an AC voltage generated from the armature coils and outputting a rectified voltage, the AC-DC converting means including:

a high-side switch having a semiconductor switching device for connecting a high-level DC current source terminal individually to the armature coils, and a low-side switch having a semiconductor switching device for connecting a low-level DC current source terminal that is set to a lower electric potential than the high-level DC current source terminal, individually to the armature coil of each phase;

rotational speed detecting means for detecting a first physical quantity related to rotational speed of the generator;

phase detecting means for detecting a second physical quantity related to phase of an a pulsating component of electromagnetic forces acting on the field pole; and control means for controlling a switch operation of the AC-DC converting means on the basis of the first and second physical quantities so as to supply the armature coil of each phase with a discharge current of the battery having such frequency and phase as to suppress the electromagnetic force pulsating component, wherein the control means turns on the high-side switch connected to an output terminal of the armature coil approximately at the time when the electric potential of the output terminal of the armature coil becomes higher than the electric potential of the high-level DC current source terminal; and the control means turns on the low-side switch connected to the output terminal of the armature coil approximately at the time when the electric potential of the output terminal of the armature coil becomes lower than the electric potential of the low-level DC current source terminal.

7. An AC power generating apparatus for charging a battery, comprising:

an AC power generator having multi-phase armature coils and a Lundell-type field pole;

AC-DC converting means for rectifying an AC voltage generated from the armature coils and outputting a rectified voltage, the AC-DC converting means including:

a high-side switch having a semiconductor switching device for connecting a high-level DC current source terminal individually to the armature coils, and a low-side switch having a semiconductor switching device for connecting a low-level DC current source terminal that is set to a lower electric potential than the high-level DC current source terminal, individually to the armature coil of each phase;

rotational speed detecting means for detecting a first physical quantity related to rotational speed of the generator;

phase detecting means for detecting a second physical quantity related to phase of a pulsating component of electromagnetic forces acting on the field pole; and control means for controlling a switch operation of the AC-DC converting means on the basis of the first and second physical quantities so as to supply the armature coil of each phase with a discharge current of the battery having such frequency and phase as to suppress the electromagnetic force pulsating component, wherein the control means turns on the high-side switch after a predetermined length of time from when the electric potential of an output terminal of the armature coil becomes higher than the electric potential of the low-level DC current source terminal; and the control means turns on the low-side switch after a predetermined length of time from when the electric potential of the output terminal of the armature coil becomes lower than the electric potential of the high-level DC current source terminal.

8. An AC power generating apparatus according to claim 6, wherein:

the control means turns off the high-side switch after a predetermined length of time from when the electric potential of an output terminal of the armature coil becomes lower than the electric potential of the high-level DC current source terminal; and the control means turns off the low-side switch after a predetermined length of time from when the electric potential of the output terminal of the armature coil becomes higher than the electric potential of the low-level DC current source terminal.

9. An AC power generating apparatus according to claim 7, wherein:

the control means turns off the high-side switch after a predetermined length of time from when the electric potential of an output terminal of the armature coil becomes lower than the electric potential of the high-level DC current source terminal; and the control means turns off the low-side switch after a predetermined length of time from when the electric potential of the output terminal of the armature coil becomes higher than the electric potential of the low-level DC current source terminal.

10. An AC power generating apparatus according to claim 7, wherein:

at least one of the high-side switch and the low-side switch is formed of SiC-MOSFET.

11. A control method for an AC power generating apparatus having an AC power generator connected to a battery and having a Lundell-type field pole, the apparatus also having AC-DC converting means for rectifying AC voltages outputted from armature coils of a plurality of phases, respectively, and for outputting a rectified voltage to a battery, said control method comprising the steps of:

detecting physical quantities respectively related to rotational speed and a phase of a pulsating component of electromagnetic forces acting on the field pole; and controlling a switch operation of the AC-DC converting means on the basis of the detected physical quantities so as to supply the armature coil of each respective phase with a discharge current from the battery having such frequency and phase as to suppress the electromagnetic force pulsating component.

* * * * *